US008736632B2

(12) United States Patent
Frensch et al.

(10) Patent No.: US 8,736,632 B2
(45) Date of Patent: May 27, 2014

(54) IMAGE PROCESSOR

(75) Inventors: Jochen Frensch, Villinger-Schwenningen (DE); Karl Bühler, Bad Dürrheim (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 2080 days.

(21) Appl. No.: 11/441,838

(22) Filed: May 26, 2006

(65) Prior Publication Data

US 2007/0002072 A1    Jan. 4, 2007

(30) Foreign Application Priority Data

May 30, 2005    (EP) .................................. 05011637

(51) Int. Cl.
G09G 5/02 (2006.01)
G09G 5/00 (2006.01)
G06K 9/36 (2006.01)
G06K 9/60 (2006.01)
H04N 9/74 (2006.01)

(52) U.S. Cl.
USPC ........... 345/592; 345/629; 345/639; 348/586; 382/284; 382/302

(58) Field of Classification Search
USPC ........... 345/592, 629–640; 348/586; 382/284, 382/302
See application file for complete search history.

(56) References Cited

U.S. PATENT DOCUMENTS

| 4,692,880 | A | 9/1987 | Merz et al. | |
|---|---|---|---|---|
| 6,466,210 | B1 * | 10/2002 | Carlsen et al. | 345/629 |
| 7,136,075 | B1 * | 11/2006 | Hamburg | 345/592 |
| 2002/0093516 | A1 * | 7/2002 | Brunner et al. | 345/629 |
| 2002/0122036 | A1 | 9/2002 | Sasaki | |
| 2003/0189571 | A1 * | 10/2003 | MacInnis et al. | 345/505 |
| 2003/0193512 | A1 * | 10/2003 | Komagata | 345/629 |
| 2005/0213853 | A1 * | 9/2005 | Maier et al. | 382/302 |

FOREIGN PATENT DOCUMENTS

EP           0 952 546 A2     10/1999
WO   WO 2004066139 A1 *   8/2004   ............... G06F 3/14

* cited by examiner

Primary Examiner — Tize Ma
(74) Attorney, Agent, or Firm — Brooks Kushman P.C.

(57) ABSTRACT

An image processing system computes blended pixel data from two image layers and α-layer data. α-layer data indicates a transparency of one of the image layers. The image processing system includes more than one memory capable of storing pixel data. A processor is programmed to apply different processing methods to pixel data based on their storage locations. A selector may obtain pixel data from each image layer and the α-layer data. The selector may transmit the pixel data to one of the multiple memories based on the α-layer data.

44 Claims, 11 Drawing Sheets

IMAGE PROCESSOR

BACKGROUND OF THE INVENTION

1. Priority Claim

This application claims the benefit of priority from European Patent Application No. 05011637.5, filed May 30, 2005, which is incorporated by reference herein.

2. Technical Field

The invention relates to an image processor and more specifically to an image processing system capable of performing alpha-blending.

3. Related Art

Vehicle information and entertainment systems and consumer entertainment devices may employ sophisticated graphical schemes. A vehicle information and entertainment system may display car navigation data, while transmitting video information and image elements of a graphical user interface.

An image may be blended from image layers. A blended image may include different image elements visible against a background image. An image layer may be used as a background image on an image layer. An $\alpha$-layer may also be used. The $\alpha$-layer may be associated with an image layer to assign a transparency value to image elements.

In image blending, an image layer may include an $\alpha$-layer indicating a transparency of the image. It may be possible to semi-transparently overlay image elements on a background image. For an image element, a corresponding $\alpha$-layer element may specify an image element as opaque. Another image element may be determined by an $\alpha$-layer element to be semi-transparent. A remaining area of the image layer may be transparent. An image element in the blended image may be displayed as opaque in front of a background image. In some screens, another image element may be visible as semi-transparent in front of the background image.

An $\alpha$-blending may create dynamic image effects such as a fade-in/fade-out of image elements. Such effects may be applied to elements of a graphical user interface to give the graphical user interface a more sophisticated appearance.

Vehicle information and entertainment systems and consumer entertainment devices may employ complex graphic controllers. These graphic controllers generate images to be displayed from image layers. The layered images allow independent control of different image elements of a complex blended image.

Graphic controllers that perform image overlay and blending processing may be expensive. Graphic controllers may be designed as a general-purpose device to meet the requirements of some graphic applications. However, a specific application may use only a fraction of their functionalities. Such graphic applications that use an overlay and blending functionality may not use a general-purpose graphic controller efficiently. Therefore, a need exists for a system that overlays and blends efficiently.

SUMMARY

An image processing system computes blended pixel data from pixel data of multiple image layers based on $\alpha$-layer data. The $\alpha$-layer data may indicate a transparency of an image layer. The image processing system may include more than one memory. A processor may apply a different processing methods to pixel data stored in different memories.

The image processing system may reduce processing loads on a graphics processor by processing the pixel data differently based on the memory location of the pixel data. Different processing may be applied to the pixel data based on the length of the $\alpha$-value.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
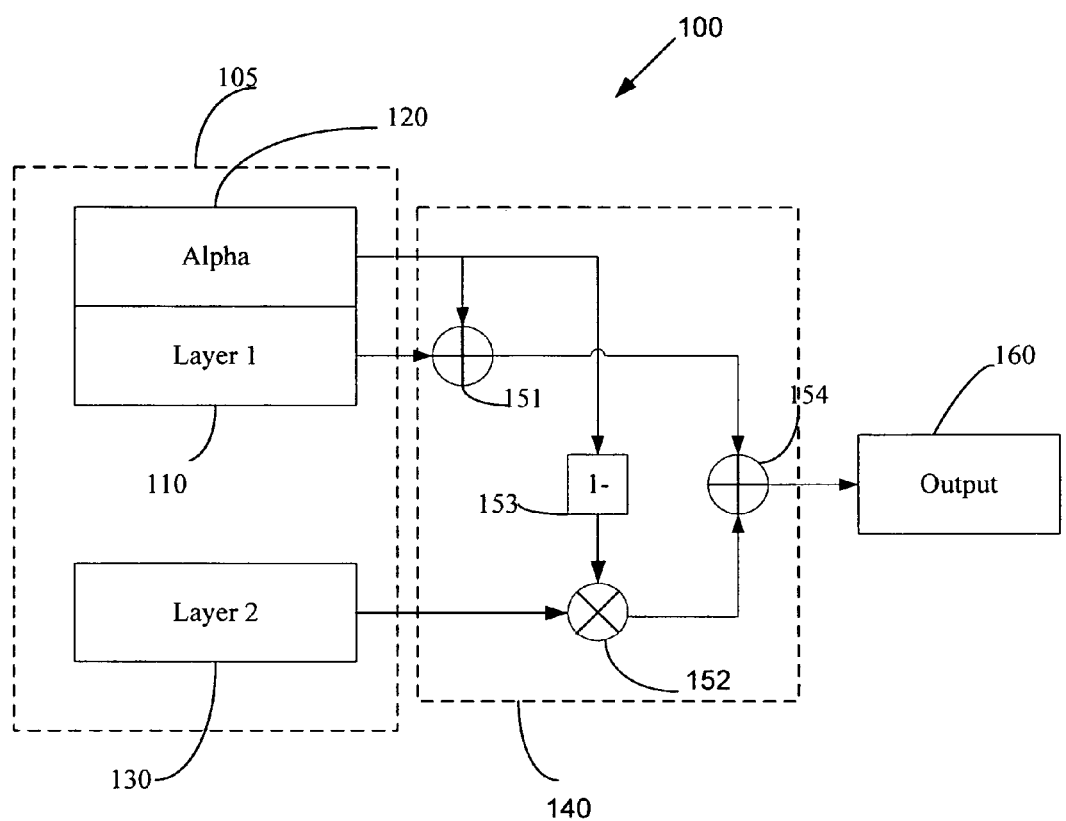
FIG. 1 illustrates an example image blending system.

An image processing system may reduce processor loads during an $\alpha$-blending process. FIG. 1 illustrates an example image blending system 100. The image blending system 100 may include a memory 105, logic 140 that processes image layers, $\alpha$-layers for a blended image, and a blended image output 160. The memory 105 may supply the logic 140 with a first image layer 110, a second image layer 130 and a layer associated with image element transparencies. The memory 105 may also store other image element parameters, such as an $\alpha$-layer 120 associated with the first image layer 110. The memory 105 may store the image data as Red, Green, and Blue (RGB) data. A color value of a blended image output 160 may be calculated from color values of the image layers 110 and 130 based on Equation A:

$$R1/2 = \alpha \times R1 + (1-\alpha) \times R2 \qquad \text{(Equation A)}$$

In Equation A, R1/2 may represent a red color value of a pixel of the blended image output 160, R1 may represent a red color value of a pixel of the image layer 10, and R2 may represent a red color value of a pixel of the image layer 130. $\alpha$ may represent a transparency value of the $\alpha$-layer 120, and may indicate the blending operation to apply to the pixel data R1 and R2. Equation A may apply to $\alpha$ values between (and including) about 0 and about 1. The $\alpha$ values of about 0 and about 1 may express full transparency and full opacity, respectively, of image layer 110 with respect to the corresponding pixel data of image layer 130.

This calculation may be performed for each color value R, G, B and for each pixel of blended image output 160. The arithmetic processing elements 151, 152, 153 and 154 may comprise the logic 140, and may perform multiplications, subtractions and additions, respectively, performed by the image processing system 100. The arithmetic processing elements 151, 152, 153 and 154 may comprise digital or analog circuitry, integrated circuits, microprocessors, microcontrollers, or computer executable code or software executable by a circuit.

Equation A may be applicable to images stored with the RGB color coding standard. Other color coding system, such as Luminance (Y), and Chrominance (YUV); Y, In-Phase, and Quadrature (YIQ); Y, Blue Color Difference, and Red Color Difference (YDbDr); Hue, Saturation, and Value (HSV); Hue, Saturation, and Luminance (HSL), and others may also be applied through an equation equivalent or similar to Equation A.

The memory 105 may comprise a volatile memory such as a dynamic random access memory (DRAM), or static random access memory (SRAM). The memory 105 may also comprise a non-volatile memory such as an electrically eraseable programmable read only memory (EEPROM), flash memory, disk media such as a compact disc (CD) or a digital versatile disc (DVD), a solid state memory, or a hard drive.

Figure 2:
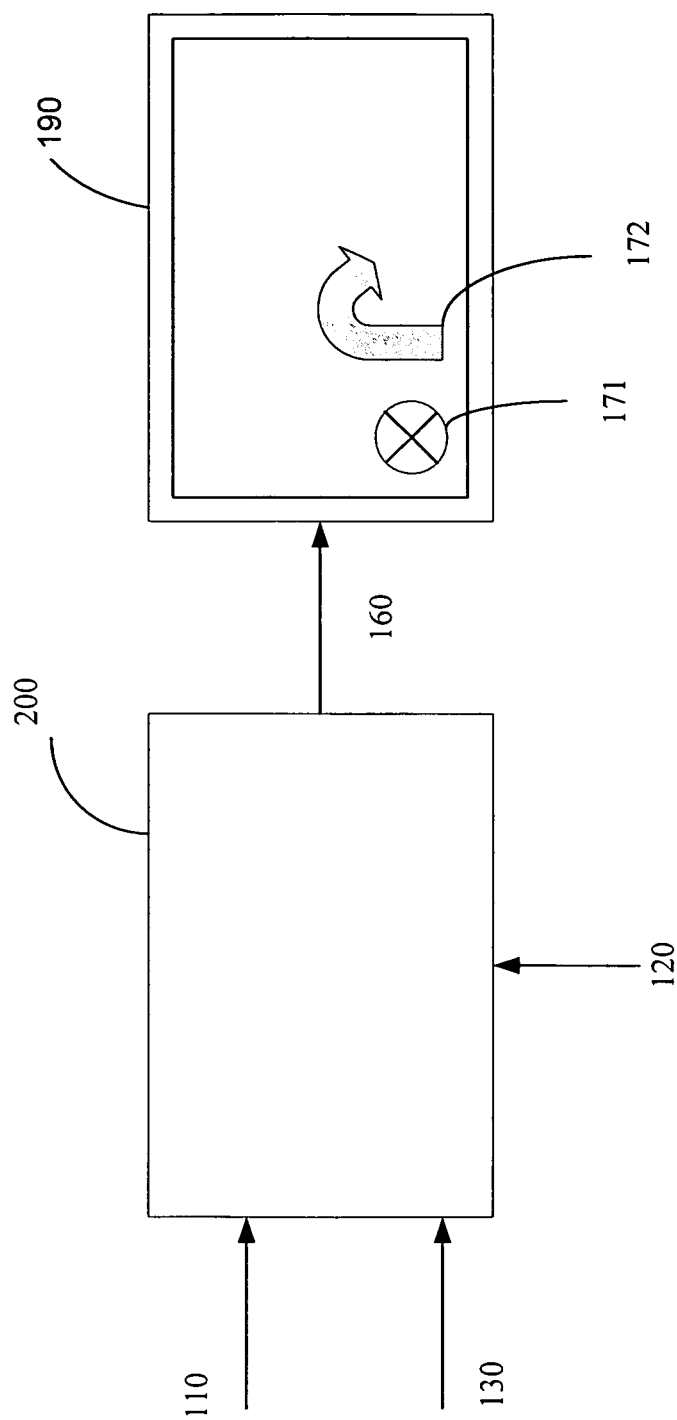
FIG. 2 illustrates an example computation for performing an $\alpha$-blending.

FIG. 2 illustrates an example computation for performing an $\alpha$-blending. The image processing system 200 may display a blended image output 160 on a display screen 190. The image processing system 200 may be provided with data from image layers 110 and 130 to blend based on data 120 of an $\alpha$-layer. Data of one or more image layers and $\alpha$-layer data may be generated by the image processing system 200. The system may be part of or coupled to a graphical user interface displayed on the display screen 190. Different image elements, such as a crossed-circle 171 or a directional arrow 172 may be available for display. Other examples include map directional graphics, user interface icons and windows, dynamic fade-in/fade-out graphics, flashing images, or other graphic elements. The display screen 190 may comprise a liquid crystal display 190, a cathode ray tube (CRT) display, a field emission display, plasma display, or lighted electronic diode (LED) display. Data contained in the image layers 110 and 130 may include graphical user interface windows, map data, video data, text data, telematics data, or other graphical data.

Figure 3:
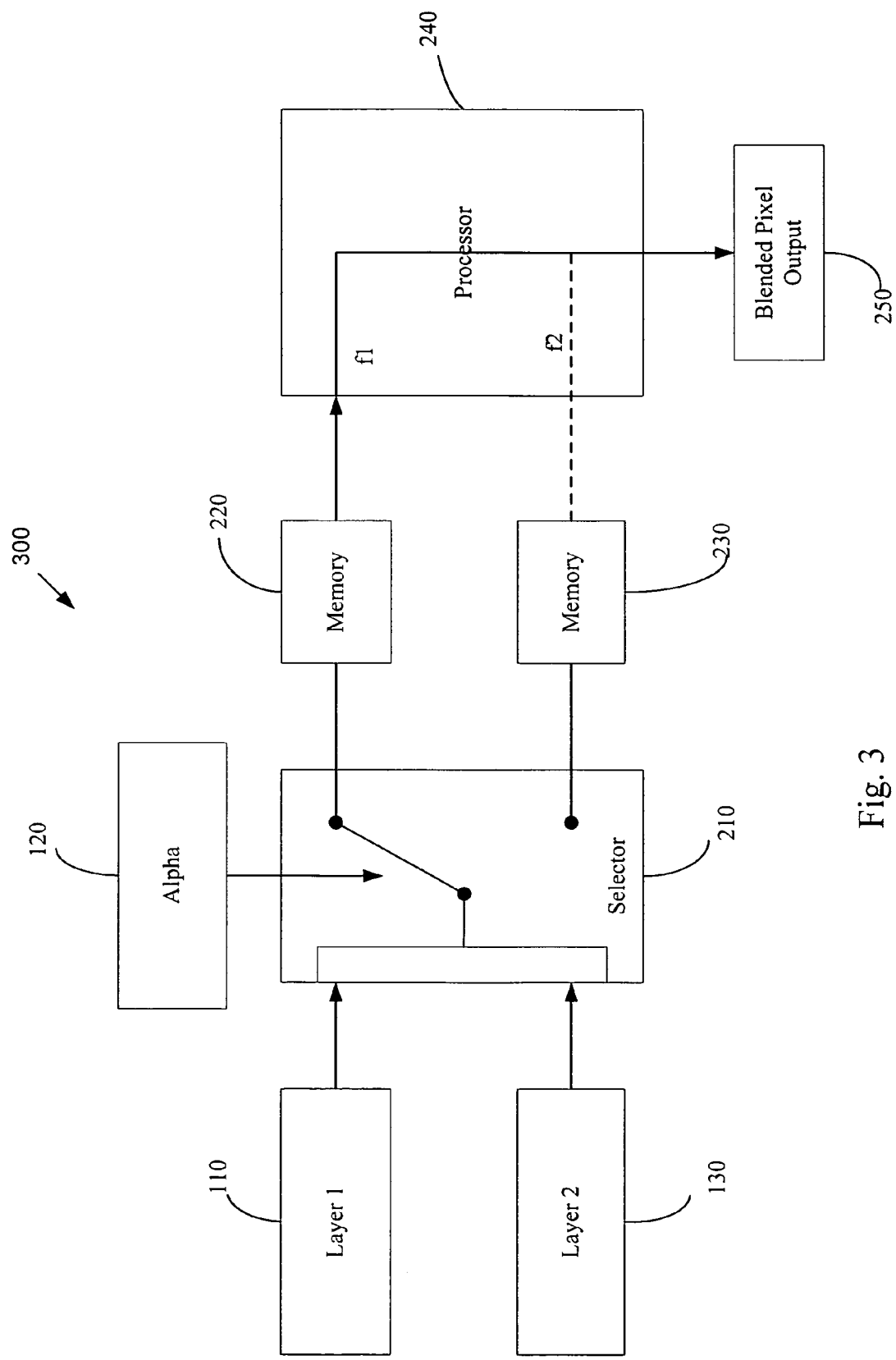
FIG. 3 illustrates an example image processing system.

FIG. 3 illustrates an example image processing system 300. The image processing system 300 may include image layers 110 and 130, an $\alpha$-layer 120, a module that is operable to choose between different modules, such as a selector 210, a storage memory 220 and 230, a module to process image graphics, such as a processor 240, and output pixel data 250. The image layers 110 and 130 may be blended by the image processing system 300, using the $\alpha$-layer 120. More than two image layers may be produced by the image processing system 300. The image processing system 300 may obtain pixel data of the two image layers 110 and 130 to be blended and may derive data of a blended pixel 250 based on the $\alpha$-layer data 120. The $\alpha$-layer data 120 may indicate the transparency of each pixel of one of the layers.

Image layer data elements, such as pixels of the two image layers 110 and 130, may be supplied to the selector 210 which may store the data of the two pixels in one of the memories 220 and 230. The selection of the memory 220 and 230 may be made based on the $\alpha$-layer data.

The memories 220 and 230 may comprise a volatile memory such as a DRAM, or an SRAM. The memories 220 and 230 may also comprise a non-volatile memory such as an EEPROM, flash memory, disk media such as a CD or a DVD, a solid state memory, or a hard drive. The selector 210 or the processor 240 may comprise digital or analog circuitry, integrated circuits, microprocessors, microcontrollers, or computer executable code or software executable by a circuit.

The data stored in one of the memories 220 and 230 may be processed by the processor 240. The processor 240 may apply different processing operations f1 or f2 to the data stored in the memories 220 and 230. A different blending operation may be assigned to each of the memories, to blend the data stored in the memories 220 and 230. The processing method may generate a blended pixel value 250. Examples of blending include arithmetic averaging, median computation, linear and non-linear filtering and smoothing, statistical processing, and other pixel processing operations.

Figure 4:
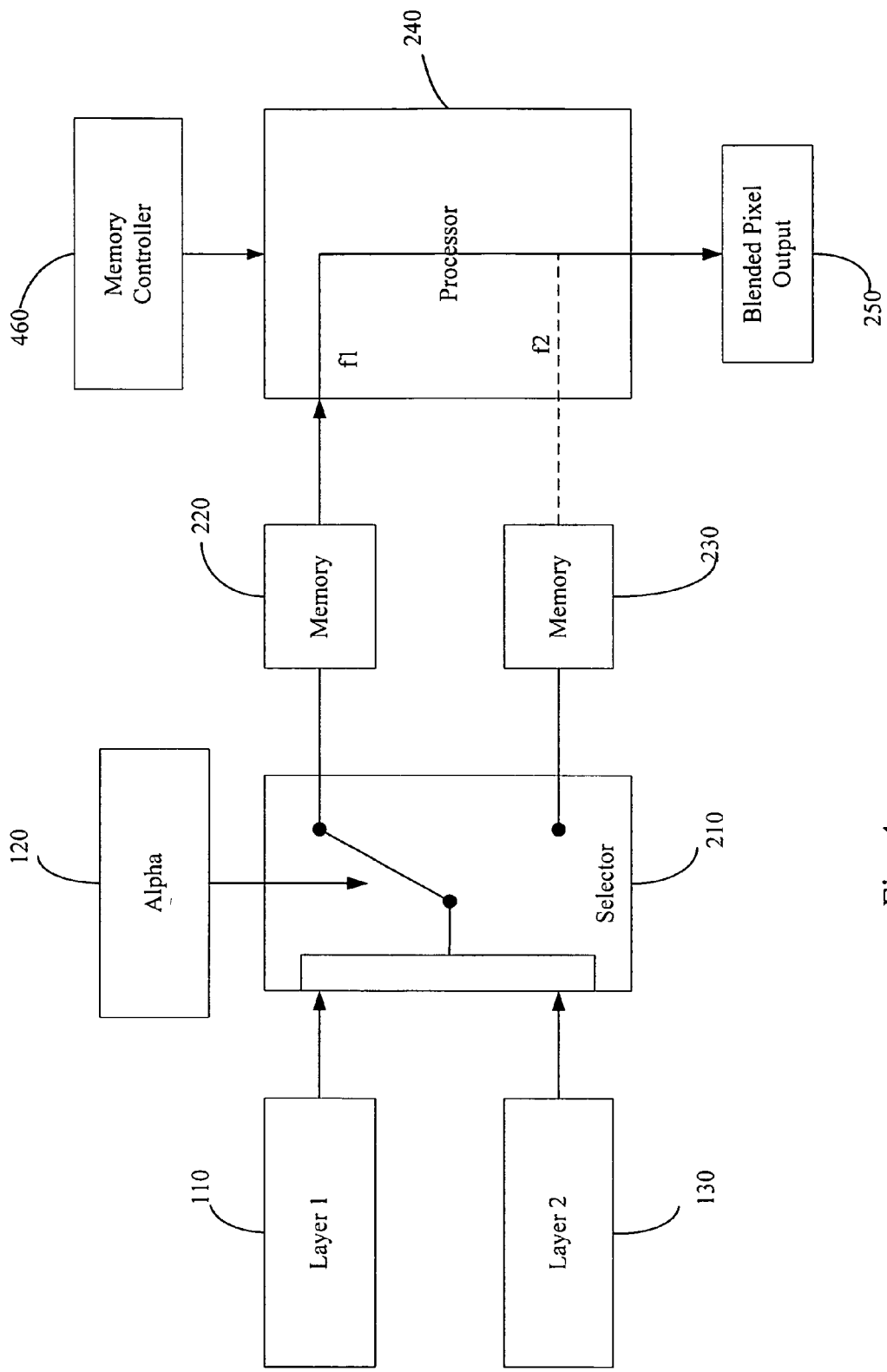
FIG. 4 illustrates a second example image processing system.

FIG. 4 illustrates an image processing system 400 having a module for controlling memory read and write access, such as a memory controller 460. The processor 240 may process the data of the memory 220 and 230 to which the selector 210 has output pixel data. The memories 220 and 230 may be reset to an initial value, and the data of the memory that holds data different from the initial value may be processed. The processor 240 may be notified to which of the memories 220 and 230 a write access may be performed by the memory controller 460.

Figure 5:
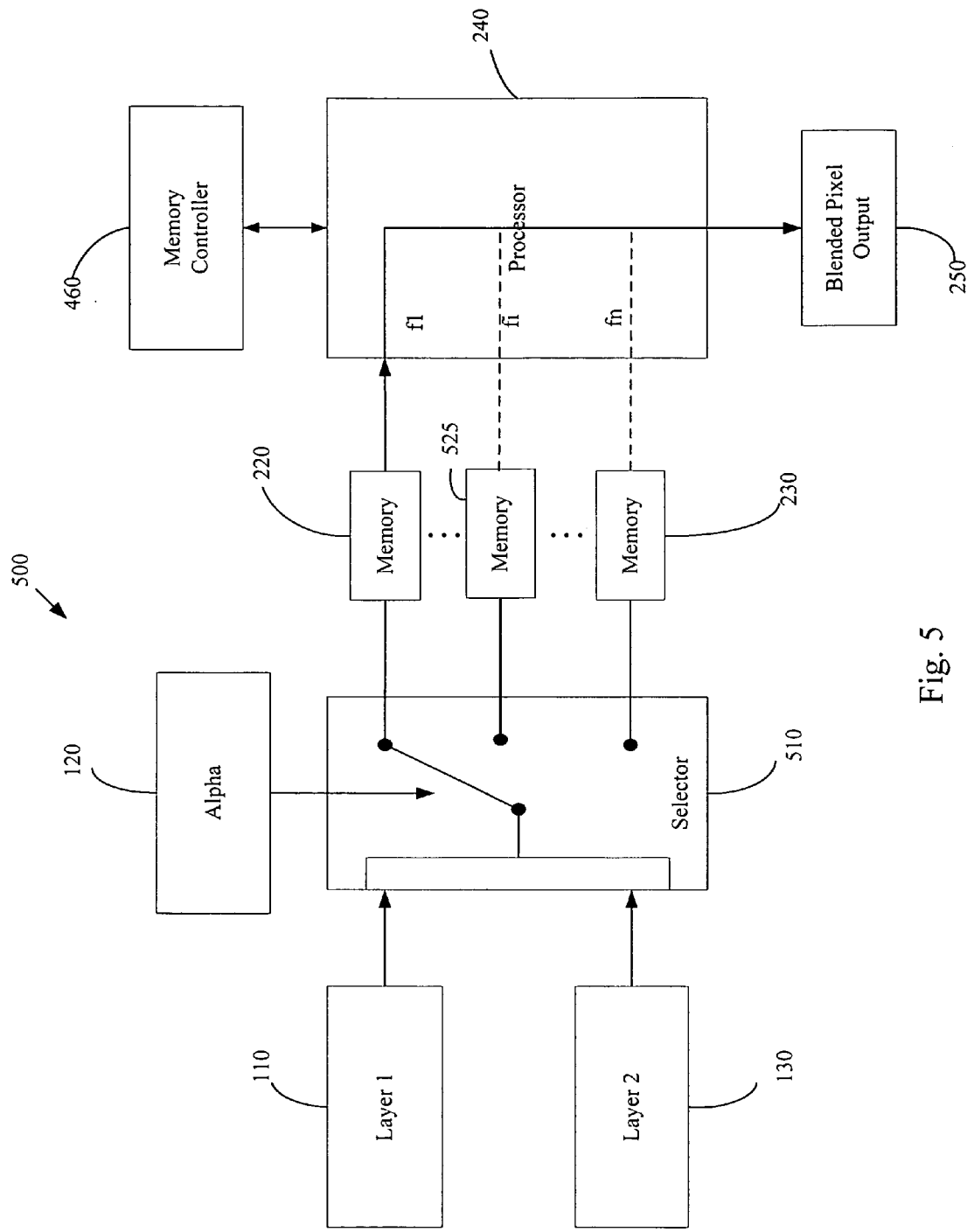
FIG. 5 illustrates a third example image processing system.

FIG. 5 illustrates an image processing system 500. The image processing system 500 may include more than two memories, 220, 230, and 525. The selector 510 may be configured with a number of outputs based on the number of memories in the image processing system 500. Each of the memories 220, 230, and 525 may serve a different blending operation, illustrated as f1, fi, and fn. The number of blending operations may be based on the number of memories 220, 230, and 525. The number of memories 220, 230, and 525 may correspond to the number of possible values of the $\alpha$-layer data, such that for each different value of $\alpha$, a different memory is selected by selector 510. The data of the two pixels to be blended from the two image layers 110 and 130 may be transmitted from the selector 210 to the processor 240 through the memories 220 and 230. Processing resources of a system controller may be used to control the graphic processing, while the image may be blended by a customized processor.

Memories 220 and 230 may have a storage capacity based on the expected data needed to blend the pixels. When blending pixels of the two image layers 110 and 130, the memory 220 and 230 capacity may correspond to the data that characterizes two pixels. The data amount needed by the processor 240 may correspond to about a single bit.

In some systems, the $\alpha$-layer data may be represented by about 4 bits. The transparency may be defined in about $\frac{1}{16}$-steps in some systems. The $\alpha$ values may be represented by other bit values too. The transparency may be defined in a coarse or in a fine resolution. Transparency values represented by about 2, 3, or up to about 8 bits may be used, when increasing resolution.

The processor 240 may perform computation on the data stored in the memories 220 and 230, where a processing parameter may be varied with the memories 220 and 230. The parameter may correspond to the $\alpha$-layer data 120.

When the $\alpha$-layer data is represented by about 4 bits, $\alpha$ may take a value between about 0 and about 15. The selector 210 may output the pixel data to be blended to one of about 16 different memories. The processor 240 may be configured to determine the following computation to obtain red, green and blue data values of the pixels to be blended:

$$R1/2 = (\alpha \times R1 + (1-\alpha) \times R2)/15 \quad \text{(Equation B1)}$$

$$G1/2 = (\alpha \times G1 + (1-\alpha) \times G2)/15 \quad \text{(Equation B2)}$$

$$B1/2 = (\alpha \times B1 + (1-\alpha) \times B2)/15 \quad \text{(Equation B3)}$$

In Equations B1-B3, R1, R2, G1, G2, B1, B2 may represent a color data of two corresponding pixels from layer 1 110 and layer 2 130 to be blended. R1/2, G1/2, B1/2, may represent a color data of the blended pixel. The computation parameter $\alpha$ may be determined based on the memory to which the pixel data to be blended was stored. $\alpha$ may be determined by assigning a value between about zero and about fifteen to each of the memories.

The parameter $\alpha$ may be determined by the processor 240 to correspond to converted data of the $\alpha$-layer supplied to the selector 210. The conversion may relate to an inversion or to a conversion of the bit width of the $\alpha$-values.

In some systems, the red and blue data values may be represented by about 5 bits. The green data value may be represented by about 6 bits, such that the red and blue data value may take a value between about 0 and about 31. The green data value may take a value between about 0 and about 63. The image data of a pixel may only require about 16 bits of storage capacity. The image data may provide a near natural viewing impression and take the higher sensitivity of the human eye in the green spectral range into account.

By representing each pixel by about 16 bits, two pixels to be blended may be transmitted on a 32 bit data bus in a single bus cycle. The transport capacity of the bus may be utilized in an efficient manner. It may be also possible to use other representations of the pixel data in combination with different bus widths.

Figure 6:
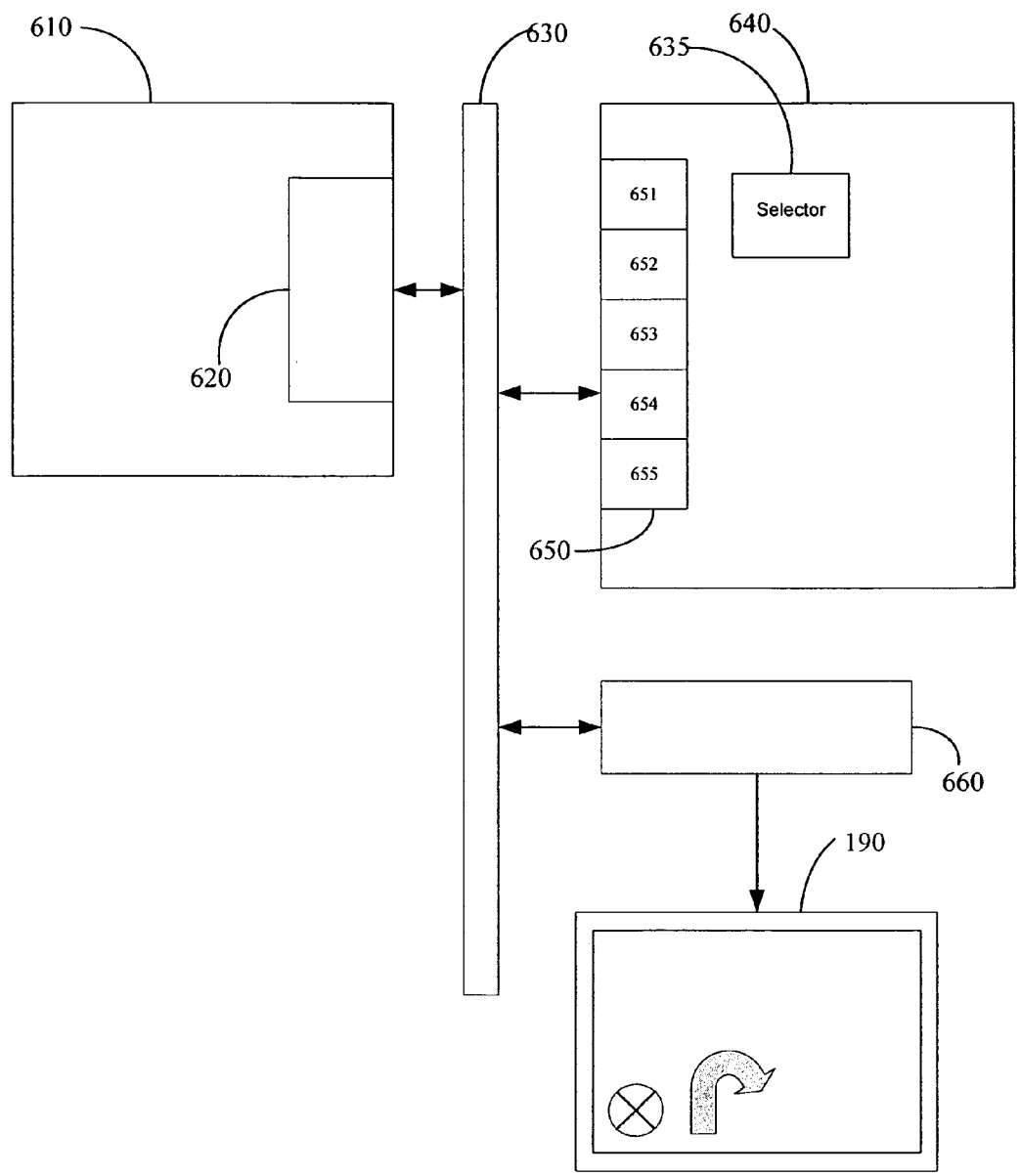
FIG. 6 illustrates an example vehicle information and entertainment device.

A data bus having a bus width of about 32 bits may be used in vehicle information and entertainment systems and consumer entertainment devices. By using an existing data bus for the transmission between the selector and the memories, the image processing system may achieve high efficiency without increasing the system complexity. FIG. 6 illustrates an example vehicle information and entertainment system 600 or a consumer entertainment device using an image processing system. The vehicle information and entertainment system 600 may include a processor, such as a microcontroller 610. The microcontroller 610 may be connected to a data bus 630 which may enable communication between devices coupled to the system 600. The microcontroller 610 may include a bus interface 620 to control the transmission of data to and from the data bus 630.

The microcontroller 610 may comprise a processor for carrying out a control program in accordance with program information stored in an internal or external memory. The vehicle information entertainment system 600 may include a display 190 and a display controller 660 operable to drive the display. The display controller 660 may receive data to be displayed through the data bus 630. The display controller 660 may be coupled to the microcontroller 610. Graphic functionalities, such as image overlay and $\alpha$-blending, may be carried out by the microcontroller 610.

Implementing the computation of the image blending, such as for Equations B1, B2, and B3 in a software program running on the microcontroller 610 may result in a high computation load on the microcontroller 610. Some microcontrollers utilized in vehicle information and entertainment systems are incapable of handling such computations in addition to controlling the operation of the vehicle information and entertainment system 600. A software implementation that computes the blended pixel values may require about one-hundred processing cycles for the calculation of each blended pixel.

To perform image blending without unduly increasing the processing load of the microcontroller 610, one or more processors 640 (one shown) may perform the computation of the blended image data. The processor 640 may include a memory 650 which may comprise a register for storing data and operation parameters. The memory 650 may be accessed by external devices through the data bus 630. Blocks 651 to 654 of the memory 650 may act as memories for receiving the pixel data to be processed. The blended pixel data computed by the processor 640 may be stored in block 655.

A selector 635 may obtain the image data to be blended. The selector 635 may comprise software running on the microcontroller 610. The selector 635 may comprise digital or analog circuitry, an integrated circuit, or other circuitry. The microcontroller 610 may acquire the pixel data of the pixels of two image layers from a storage (not shown) together with $\alpha$-layer data. Based on the $\alpha$-layer data, the microcontroller 610 may store the pixel data to be blended at an address of memory 650 through the data bus 630. The address specifies a memory block 651 to 654.

The microcontroller 610 may determine an address to transmit the pixel data by adding an offset value to a basis address of the memory 650. The offset value may correspond to the data value obtained from the $\alpha$-layer. An offset between about zero and about fifteen, for an about 4-bit $\alpha$-value, may be added to the basis address. The pixel data to be processed may be written to sixteen different blocks 651 to 654 (only four shown) of memory 650.

Upon completion of the write operation to memory 650, the processor 640 may process the written data. Based on the address to which the data has been written, one of different processing functions $f(\alpha 1)$ to $f(\alpha 4) \ldots$, each assigned to a specific memory address, may be applied to the pixel data stored in the respective block of memory 650.

Although only four memory blocks corresponding to four addresses and four different computation functions are illustrated in FIG. 6, the number of different memory blocks of memory 650 addressable under separate addresses and the number of different processing functions $f( \ldots )$ may be arranged to correspond to the number of $\alpha$-values. When employing about 4 bit $\alpha$-values, sixteen memory blocks may be used for receiving the data to be processed and sixteen different computation functions $f(\alpha 1)$ to $f(\alpha 16)$ corresponding to the sixteen different memory blocks may also be used.

The processing functions may differ in the value of the parameter $\alpha$. The parameter $\alpha$ may be determined by the offset from the basis address of memory 650 to which the data to be processed has been stored. The pixel data may be transmitted through the data bus 630 to control the processing to be carried out by a processor 640. The bandwidth of the data bus 630 may be efficiently used. The bit width of the data bus 630 may correspond to the data amount of pixel data of two pixels to be blended.

After performing the image blending computation, the processor 640 may write the computation result to another address of memory 650, which may serve as an output buffer. The computation result stored in the output buffer 655 may correspond to the blended image data. The blended pixel data may be read by the microcontroller 610 to be processed or to be supplied to the display driver 660. A blended image may be output on the display 190. The blended pixel data may be directly transmitted from the output buffer 655 to the display driver 660. The output buffer 655 may have a storage capacity corresponding to a single pixel. The data amount of a pixel may correspond to about 16 bits.

A data bus 630 of the vehicle information and entertainment system 600 may be utilized for supplying data to be processed to an auxiliary processor 640. By transmitting only the data to be processed, the data bus 630 may be utilized. A parameter indicating the transparency of an image layer may be conveyed by a selection of a storage address such that this parameter does not have to be transmitted in addition to the pixel data.

The processor 640 may be optimized to carry out the image blending based on Equations B1 to B3, or other similar equations, and may require a time period between a write cycle and a subsequent read cycle of the microcontroller 610. Instead of computing Equations B1 to B3, in some systems, the microcontroller 610 may only perform a write operation and a read operation of pixel data to be blended and the blended pixel data, respectively.

The processor 640 may comprise a programmable logic device, such as a field programmable gate array (FPGA). A field programmable gate array may allow implementation of the $\alpha$-blending computation. In addition, the field programmable gate array may be configured to carry out other control or computation tasks, such that different functionalities, including the $\alpha$-blending computation, may be implemented in a single device.

Figure 7:
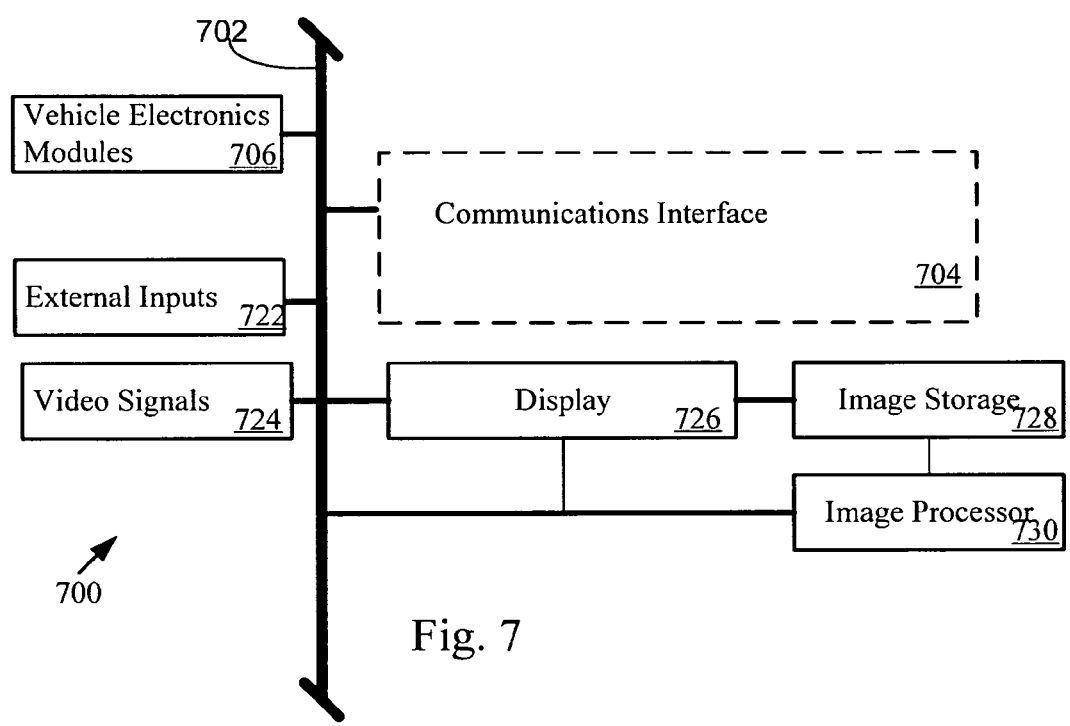
FIG. 7 illustrates an example vehicle system bus.

FIG. 7 illustrates a vehicle system bus 700 with components interfaced to the bus 702. The vehicle system bus 700 may be coupled with a vehicle information and entertainment system. The vehicle system bus 700 may include vehicle electronics modules 706 interfaced to the system bus 702. The vehicle system bus 700 may include external inputs 722 coupled with to the system bus 702. External inputs 722 may include video, audio, synchronization, data communication, or other signal inputs. The vehicle system bus 700 may include a communications interface 704 to allow a driver or user to interact with the vehicle system components interfaced to the vehicle system bus 702. The vehicle system bus 700 may include a display 726. The display 726 may be interfaced to an image storage 728 and an image processor 730. The image storage 728 and the image processor 730 may process image data to produce a blended image layer based on pixel data and an $\alpha$-layer.

Figure 8:
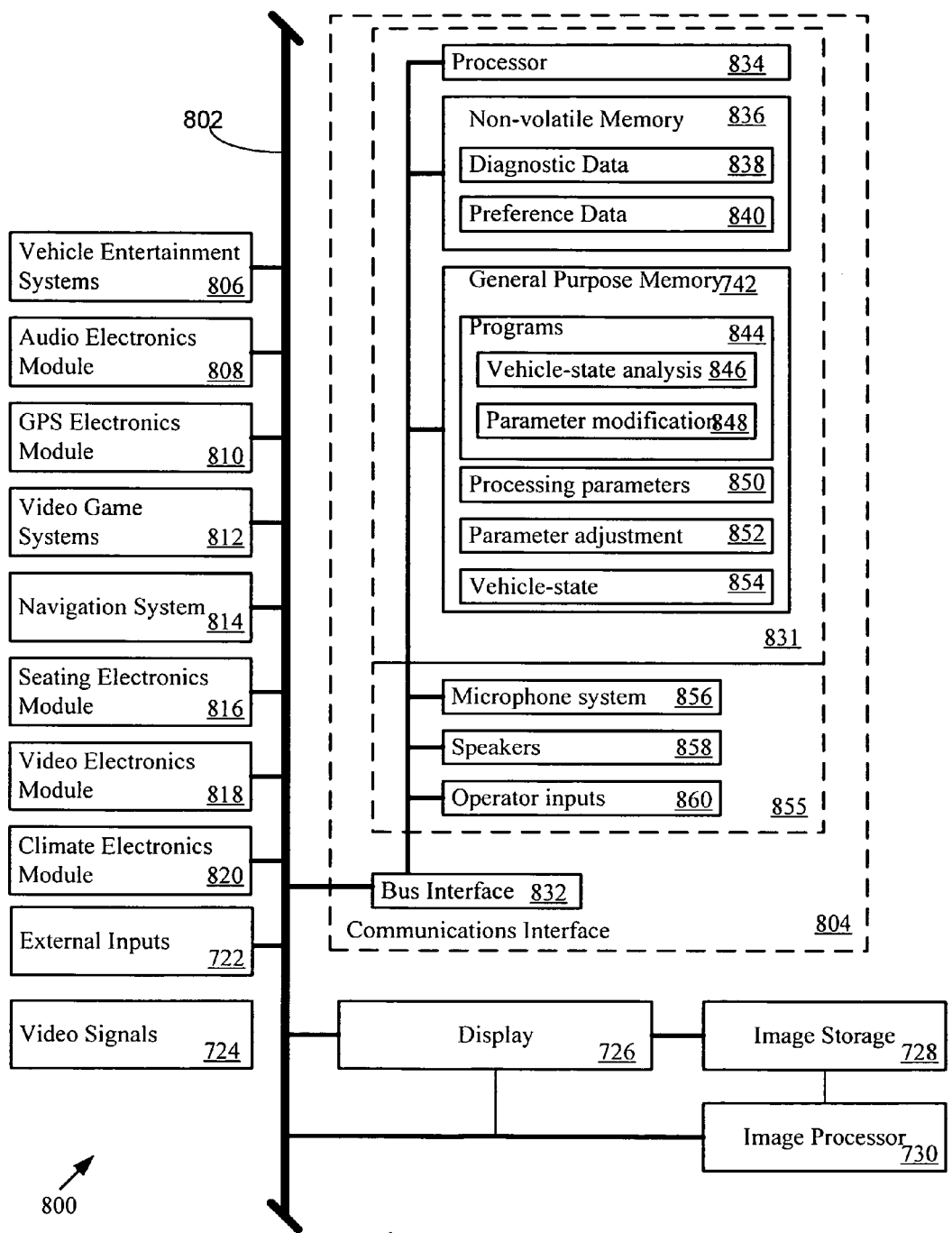
FIG. 8 illustrates a second example vehicle system bus.

FIG. 8 illustrates an example vehicle system bus 800. The vehicle system bus 800 may include additional modules coupled to a system bus 802. Vehicle control modules may include vehicle entertainment systems 806, an audio electronics module 808, a GPS electronics module 810, video game systems 812, a navigation system 814, a seating electronics module 816, a video electronics module 818, and a climate electronics module 820. The vehicle system bus 800 may include a communications interface 804 to allow a driver or user to interact with the vehicle system components interfaced to the vehicle system bus 802.

The vehicle modules 806-824 may output video signals to the display 726, and may access the display 826 through the bus 802. For example, the vehicle entertainment systems 806 may include a DVD player, CD player, video cassette player, portable music players, portable electronic devices, or laptop computers which may use the display 726 for displaying video signals. The navigation system 814 may output map data such as directional, location, or point of interest data to the display 814. The video game systems 812 may transmit a video signal to the display 726. Any of the vehicle electronics modules, such as the audio electronics module 808, GPS electronics module 810, seating electronics module 816, or entertainment and comfort module, climate electronics module 820 may transmit a video and/or audio signal to the display 726.

The communications interface 804 may include a processing module 831, an input module 855, and a bus interface 804. The processing module 831 may include processor 834, a non-volatile memory module 836, and a general purpose memory module 842. The processor 834 may include one, two, or more processors dedicated to different tasks within the vehicle system bus 800, or the processors may share the processing load of the system 800. The processor 834 may include special purpose processors such as graphics, video, DSP, or sound processors. The processor may be in the form of a microprocessor, microcontroller, DSP, ASIC, FPGA, or other integrated circuit device.

The non-volatile memory module 836 may include a diagnostic data module 838 and a preference data module 840. The diagnostic data module 838 and the preference data module 840 may be partitions of the non-volatile memory module 836, or may be separate modules interfaced with the non-volatile memory module 836. The diagnostic data module 838 may store data associated with the operation of the vehicle, such as engine data, tire pressure, fluid levels and pressures, battery charge level, temperature, tachometer data, and other vehicle performance information. The preference data module 840 may store information associated with driver and/or passenger settings and preferences such as seat and/or mirror configurations, climate control preferences, radio station settings, and other preference information. The non-volatile memory module 836 may be a flash memory, a floppy disk, hard disk drive, removable media such as DVD or CD, or other solid state memory device that retains data for a substantial period of time.

The general purpose memory module 842 may include a programs module 844, a processing parameters module 850, a parameter adjustment module 852, and a vehicle state module 854. The programs module 844 may include a vehicle-state analysis module 846 and a parameter modification module 848. Any of the modules 844-854 may be partitions of the general purpose memory module 842 or may be separate modules interfaced with the general purpose memory module 842.

The programs module 844 may include data associated with operations of the communications interface 804 or data associated with operations of other modules interfaced with the bus 802. The programs module 844 may include firmware, source code, or object code stored in the general purpose memory 842, or within the vehicle-state analysis module 846 or the parameter modification module 848. The vehicle-state analysis module 846 may include data associated with the vehicle's status and diagnostic information. The vehicle-state analysis module 846 may include instructions and/or logic for responding to certain vehicle states, alerting the occupant of the vehicle to certain vehicle states, or transmitting signals to other modules interfaced to the bus 802 within the vehicle. The parameter modification module 848 may include instructions and/or logic for modifying parameters associated with the vehicle operation or vehicle state, such as engine parameters, electronics parameters, navigation parameters, communications parameters, or other vehicle operation parameters.

The processing parameters module 850 may include data, instructions, and/or code for storing, processing, or responding to processing parameters associated with the operations of the communications interface 804. The processing parameters module 850 may store settings related to the input module 855 or the bus interface 832. The parameter adjustment module 852 may include data, instructions, and/or code for adjusting parameters associated with the communications interface 804 or input module 855, such as microphone, speaker, keyboard, joystick, touch pad, or remote settings, or settings for other input units interfaced to the communications interface 804. The vehicle-state module 854 may store data associated with the vehicle operation or vehicle state, such as engine parameters, electronics parameters, navigation parameters, communications parameters, or other vehicle operation parameters. The vehicle-state module 854 may be accessed by the vehicle-state analysis module 846. The general purpose memory 842 and the modules 844-854 may be in the form of volatile memory, such as DRAM, SRAM, or EPROM, or may be non-volatile memory such as flash, floppy disk, hard disk, removable media such as DVD or CD, or other storage media.

The input module 855 may include a microphone system 856, speakers 858, such as loudspeakers or headphones, and operator inputs 860. The microphone system 856 may include noise-canceling microphones, directional microphones, or microphones interfaced to other devices which are coupled to the communications interface 804 through the vehicle bus 802. Operator inputs 860 may be received from joysticks, touch pads, speech recognition units, haptic inputs, light pens, touch screen styli, touch screens, tablet screens, track balls, track pointers, mouse inputs, wired or wireless remote units, and other input devices that allow a user to input information into the communications interface 804.

The bus interface 832 may include circuitry, software, firmware, source code, or object code configured to allow the communications interface 804 to interact with the modules interfaced to the vehicle system bus 800 through the bus 802. The bus interface 832 may process bus instructions transmitted through the bus 832 and may prioritize, route, delete, modify, or queue signals or instructions transmitted through the bus 832.

Figure 9:
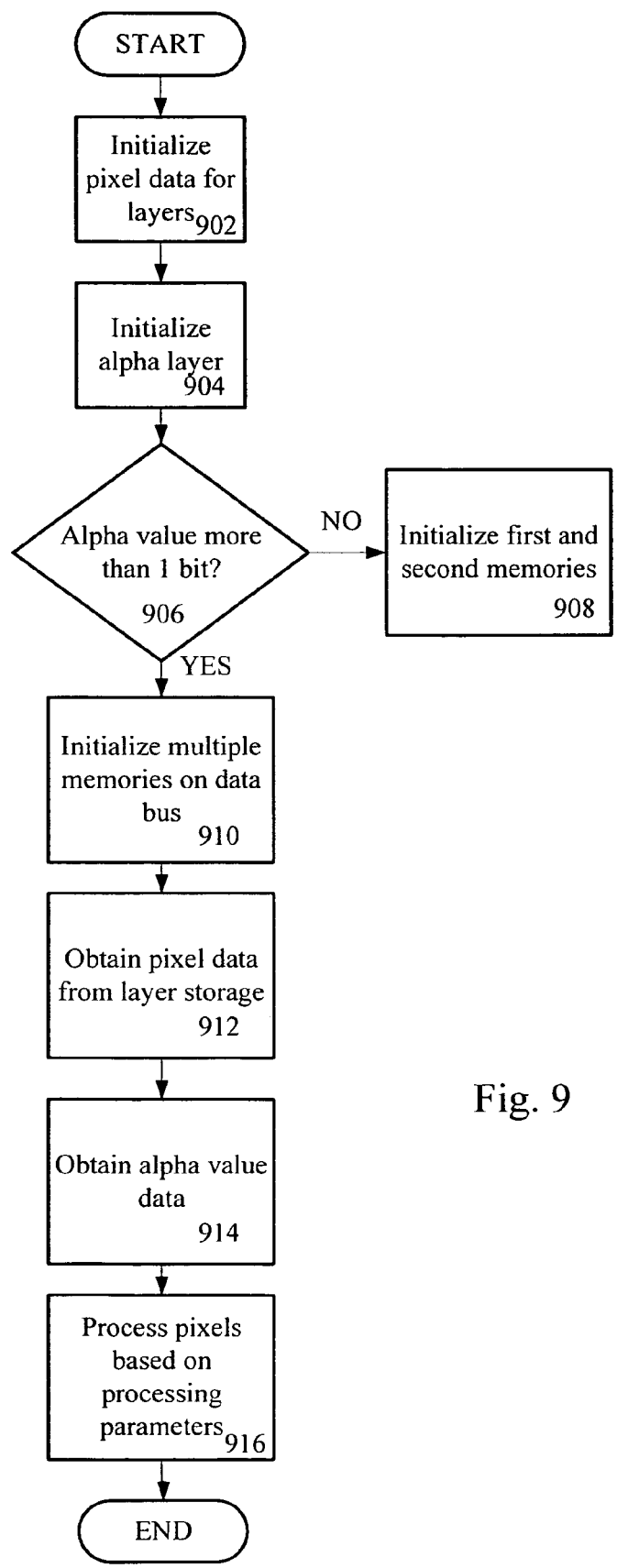
FIG. 9 illustrates an example process that blends image layers.

FIG. 9 illustrates an example process that blends image layer data. Any of the components described in FIGS. 3-6 may be configured to implement a portion or all of the acts of the process. Pixel data may be initialized for the image layers to be blended, at block 902. The pixel data may be stored in memory, through a serial, or a parallel interface. The pixel data may also be provided dynamically during the process. The α-layer data may be initialized, at block 904. As for the pixel data, the α-layer data may be stored in memory, through a serial, or a parallel interface. The α-layer data may also be provided dynamically during the process.

The image processing system may determine if the α-value is more than one bit, at block 906. If the α-value is one bit, then a first memory and a second memory may be initialized to receive pixel data from the image layers, at block 908. If the α-value is more than one bit, then more than two memories may be initialized to receive pixel data from the image layers on a data bus, at block 910. The image processing system obtains pixel data from the memory storing the layer data, at block 912. The pixel data may be communicated from the memory using a wired or wireless connection, or the memory may be interfaced to the selector for retrieval. The α-layer data is obtained, at block 914, from the α-layer data storage.

Figure 10:
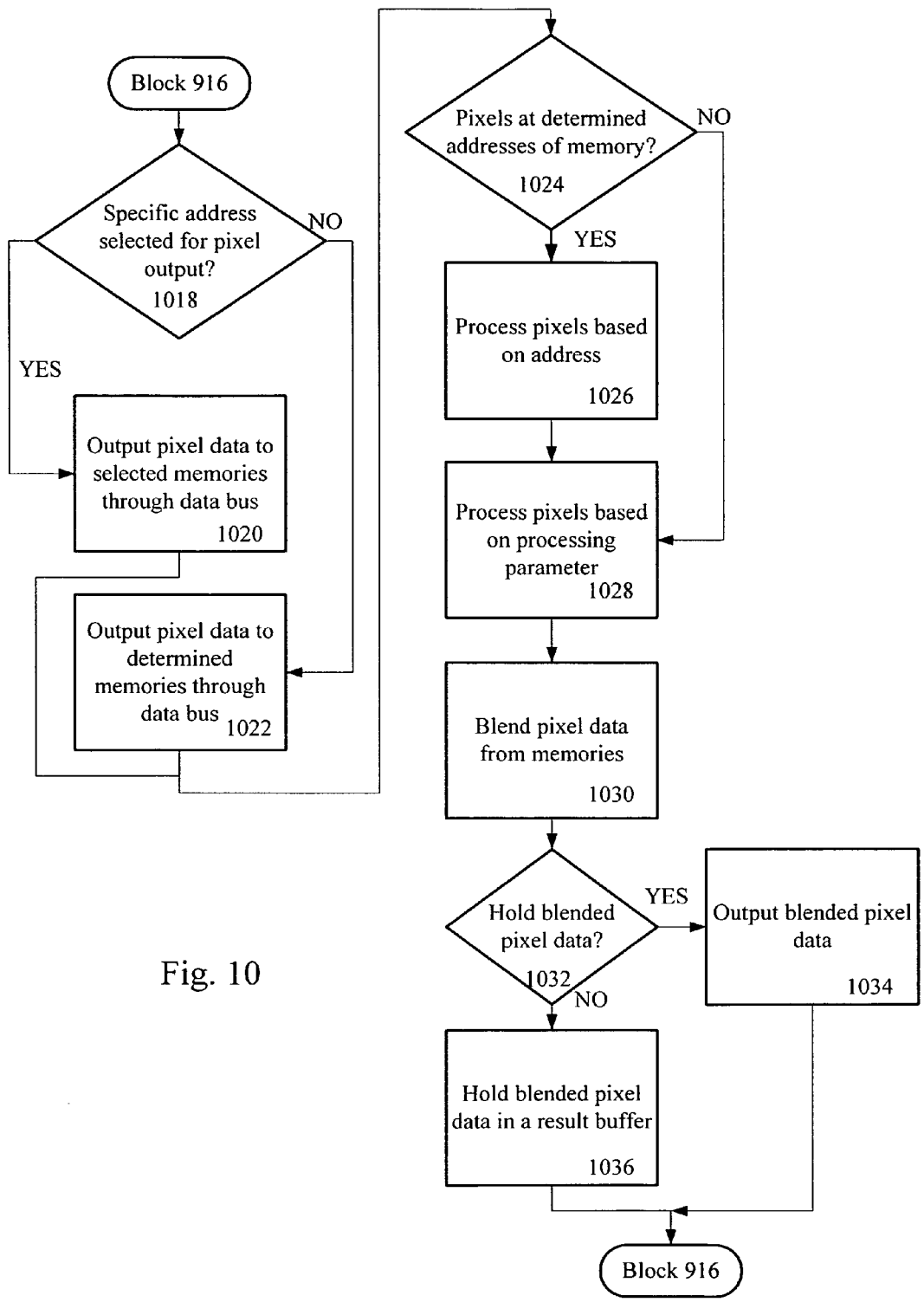
FIG. 10 illustrates example acts for the process illustrated in FIG. 7.

The image processing system processes the pixel data based on processing parameters associated with the pixel data, at block 916. FIG. 10 illustrates acts that process the pixel data as example details for block 1016. The image processing system may determine, at block 1018, if a specific address in the memories is selected for pixel output, such as by using a selector module. If a specific address in the memories is selected for pixel output, pixel data is output to the selected memory addresses using the data bus, at block 1020. If a specific address in the memories is not selected for pixel output, the pixel data is output to a determined memory address, at block 1022. The determined memory address may be provided at initialization, or provided dynamically by the image processing system.

The image processing system may determine if the pixel data has been stored at a determined memory address, at block 1024. The pixel data may be processed based on the determined memory address, at block 1026, if the pixel data address is associated with a processing operation related to that memory address. For example, if a memory address is related to an arithmetic averaging operation, while a different memory address is related to median processing, the image processing system will determine the appropriate processing to perform on the pixel data. If the pixel data is not located at a determined memory address, the image processing system may process the pixel data based on processing parameters, at block 1026. The image processing system may process the pixel data processed at block 1024 as well. The image processing system may process the pixel data differently based on the memory that the pixel data is stored in, time related parameters, image layer type, or other parameters.

The image processing system blends the processed pixel data, at block 1030. The image processing system may utilize Equations B1-B3, or other pixel blending techniques, to blend the pixel data. The image processing system then determines, at block 1032, whether to hold the blended pixel data. If the blended pixel data is to be held, the blended pixel data may be stored in a result buffer, at block 1036. If the blended pixel data is not to be held, the blended pixel data may be output, at block 1034. The blended pixel data may be output on a display screen, for example. The image processing system then returns control to block 1016.

Figure 11:
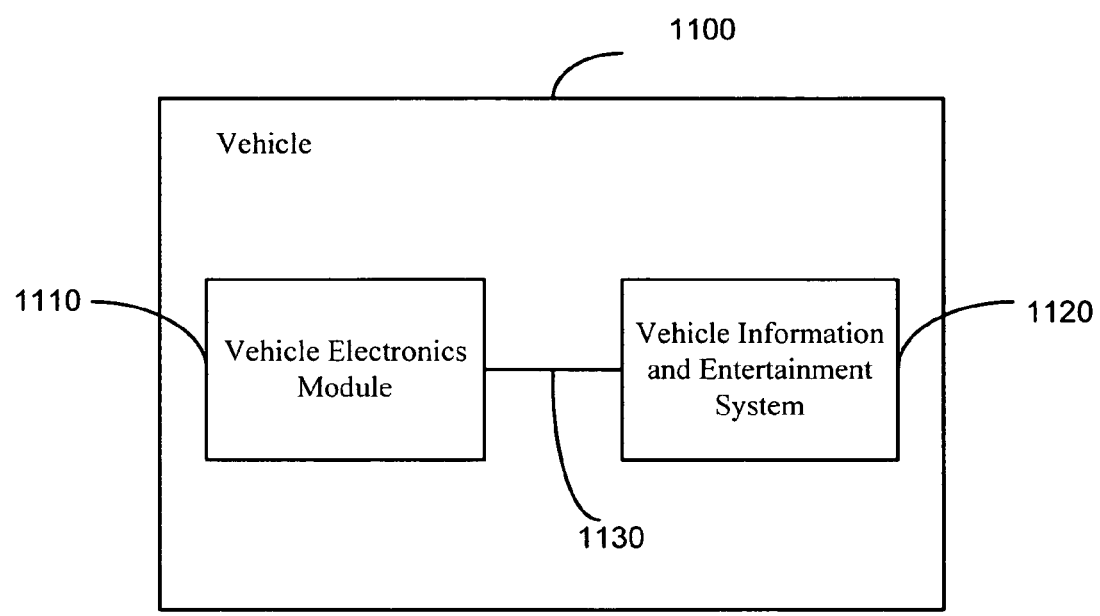
FIG. 11 illustrates an example vehicle information and entertainment system.

FIG. 11 illustrates an example vehicle configuration. A vehicle 1100 may include a vehicle electronics module 1110 and a vehicle information and entertainment system 1120. The vehicle electronics module 1110 and the vehicle information and entertainment system 1120 may be coupled to a vehicle system bus 1130. The vehicle information and entertainment system 1120 may include a microcontroller 610, a processor 640, a system bus 630, and an output 190, as described in FIG. 6. The vehicle system bus 1130 may include communications interfaces and bus interface modules as described in FIGS. 7 and 8. The vehicle electronics module 1110 may include modules for vehicle operation, navigation, audio and video inputs and outputs, signal inputs and outputs, and other modules related to a vehicle operation or control. A vehicle may include an automobile, a truck, a motorcycle, an all-terrain vehicle, or other land conveyance, an airplane, a helicopter, a balloon, or other aerial vehicles, a boat, a submarine, or other water-borne craft, rockets, and space-borne vehicles.

A vehicle information and entertainment system may be capable of performing graphic functionalities such as image blending. A display driver used with the process disclosed for image blending on a programmable logic device may also be used. The processor performing the image blending may be integrated with the display driver. The control of the programmable logic device may also be performed by a microcontroller of the vehicle information and entertainment system. The pixel data to be blended may be transmitted through the system data bus. The amount of data transmitted to an image processor carrying out blending processing may be reduced.

Like the method shown in FIGS. 9 and 10, the sequence diagrams may be encoded in a signal bearing medium, a computer readable medium such as a memory, programmed within a device such as one or more integrated circuits, or processed by a controller or a computer. If the methods are performed by software, the software may reside in a memory resident to or interfaced to the processor 240, a communication interface, or any other type of non-volatile or volatile memory interfaced or resident to the image processing system 300-500. The memory may include an ordered listing of executable instructions for implementing logical functions. A logical function may comprise digital circuitry, through source code, through analog circuitry, or through an analog source such as through an analog electrical, audio, or video signal. The software may be embodied in any computer-readable or signal-bearing medium, for use by, or in connection with an instruction executable system, system, or device. Such a system may include a computer-based system, a processor-containing system, or another system that may selectively fetch instructions from an instruction executable system, system, or device that may also execute instructions.

A "computer-readable medium," "machine-readable medium," "propagated-signal" medium, and/or "signal-bearing medium" may comprise any means that contains, stores, communicates, propagates, or transports software for use by or in connection with an instruction executable system, system, or device. The machine-readable medium may selectively be, but not limited to, an electronic, magnetic, optical, electromagnetic, infrared, or semiconductor system, system, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An image processing system that computes blended pixel data from pixel data of two image layers based on α-layer data from an α-layer, where the α-layer data indicates a transparency of one of the two image layers comprising:
   a plurality of memories, where each memory comprises a storage capacity for two pixels of data;
   a processor configured to apply a different processing to pixel data stored in different addresses of the plurality of memories to compute blended pixel data; and
   a selector that selects one of the plurality of memories based on the α-layer data, and sends the pixel data, with one pixel from each of the first layer and the second layer, to the selected memory.

2. The image processing system of claim 1 where a number of the memories for storing pixel data processed by the processor corresponds to a number of possible values of the α-layer data.

3. The image processing system of claim 1 further comprising a data bus coupling the plurality of memories and the selector.

4. The image processing system of claim 3 where a capacity of the data bus corresponds to the pixels to be processed.

5. The image processing system of claim 4 where the data bus comprises a width of 32 bits.

6. The image processing system of claim 5 where data of each pixel comprises a green color value of 6 bits, a red color value of 5 bits, and a blue color value of 5 bits.

7. The image processing system of claim 1 where the processor comprises a storage subdivided into blocks.

8. The image processing system of claim 7 where the selector comprises a controller operable to output the pixel data to a specific address of the storage.

9. The image processing system of claim 8 where the processor is configured to differently process the pixel data stored at different addresses of the storage.

10. The image processing system of claim 9 where the storage further comprises a buffer operable to store the computed blended pixel data.

11. The image processing system of claim 10 where the buffer comprises a second storage.

12. The image processing system of claim 1 where the processor comprises a field programmable gate array.

13. The image processing system of claim 1 where the α-layer comprises a transparency data value for each pixel of one of the two image layers.

14. The image processing system. of claim 13 where each transparency data value comprises a 4 bit data value.

15. The image processing system of claim 1 where the processor is configured to process the pixel data based on a processing parameter that varies with the plurality of memories.

16. The image processing system of claim 1 further comprising a display and an image processing means coupled to the processor.

17. The image processing system of claim 16 further comprising:
   a microcontroller operable to control a vehicle information and entertainment system; and
   a program storage operable to store and retrieve software executable on the microcontroller to implement the selector.

18. An image processing method that computes blended pixel data from pixel data of two image layers based on α-layer data, where the α-layer data indicates a transparency of one of the image layers, comprising:
   obtaining pixel data of each image layer and the α-layer data;
   selecting one of a plurality of memories based on the α-layer data, where the plurality of memories comprise a storage capacity for data representing two pixels;
   sending the pixel data to the selected memory; and
   applying different processing methods to compute a blended pixel data.

19. The image processing method of claim 18 where a number of the memories for storing pixel data to be processed corresponds to a number of possible values of the α-layer data.

20. The image processing method of claim 18 where sending the pixel data comprises sending the pixel data to one of the memories through a data bus.

21. The image processing method of claim 20 where the data bus comprises a parallel bus.

22. The image processing method of claim 20 where the data bus has a width of 32 bits.

23. The image processing method of claim 22 where the pixel data comprises a green color value of 6 bits, a red color value of 5 bits, and a blue color value of 5 bits.

24. The image processing method of claim 18 where the plurality of memories comprises blocks of a storage.

25. The image processing method of claim 24 where sending the pixel data comprises sending the pixel data to a specific address of the storage based on a value of the α-layer data.

26. The image processing method of claim 25 where applying different processing methods comprises applying the different processing methods to pixel data stored at different addresses in the storage.

27. The image processing method of claim 24 further comprising storing the computed blended pixel data in a buffer of the storage.

28. The image processing method of claim 27 where the result buffer comprises a region of a memory where data is temporarily held while waiting to be transferred between two locations.

29. The image processing method of claim 18 where the different processing methods are processed by a field programmable gate array.

30. The image processing method of claim 18 where the α-layer comprises a transparency data value for each pixel of image layers.

31. The image processing method of claim 30, where each transparency data value is represented by a 4 bit data value.

32. The image processing method of claim 18 where applying a different processing method comprises processing the pixel data based on a processing parameter that varies with the plurality of memories.

33. An image processing system that computes blended pixel data from pixel data of two image layers based on α-layer data, where the α-layer data indicates a transparency of one of the image layers, the image processing system comprising:
a plurality of memories, where each memory comprises a storage capacity for two pixels of data;
a processor configured to apply a different processing to pixel data stored in different addresses of the plurality of memories to compute blended pixel data;
a selector that selects one of the plurality of memories based on the α-layer data, and transmits the pixel data to the selected memory;
a microcontroller operable to control a vehicle information and entertainment system; and
a program storage operable to store and retrieve software executable on the microcontroller to implement the selector.

34. An image processing apparatus that computes blended pixel data from pixel data of two image layers based on α-layer data, where the α-layer data indicates a transparency of one of the two image layers, the apparatus comprising:
a plurality of registers, where each register is associated with a different one of a plurality of predefined α-layer data values and provides storage capacity for two pixel data items;
a gate array configured to implement, for each register, an image blending function for computing blended pixel data from the pixel data items stored within the register on the basis of the α-layer data value associated with the register; and
a selector operable to obtain two pixel data items and address information, and to store the obtained pixel data items to a register of the plurality of registers indicated by the address information.

35. The image processing apparatus of claim 34, further comprising a data bus coupling the plurality of registers and the selector, where a bit width of the data bus is wide enough to transmit the two pixel data items in parallel.

36. The image processing apparatus of claim 34, where the gate array comprises a storage means subdivided into a plurality of blocks, where each of the registers is a different one of the plurality of blocks, and where the selector comprises a controller operable to store the obtained pixel data items to an address of the storage, the address being indicated by the address information obtained by the selector.

37. The image processing apparatus of claim 34, further comprising an output register for holding the computed blended pixel data, where the output register is a part of the gate array.

38. The image processing apparatus of claim 34, where the gate array is a field programmable gate array.

39. An image processing system comprising the image processing apparatus of claim 34, a display, an image processing means coupled to the image processing apparatus, a microcontroller operable to control a vehicle information and entertainment system, and a program storage operable to store and retrieve software executable on the microcontroller.

40. An image processing method for computing blended pixel data from pixel data of two image layers based on α-layer data, the α-layer indicating a transparency of one of the image layers, the method comprising the steps of:
providing a plurality of registers, where each register is associated with a different one of a plurality of predefined α-layer data values and provides storage capacity for two pixel data items;
implementing a plurality of image blending functions in a gate array, each image blending function computing blended pixel data from pixel data stored in a corresponding one of the plurality of registers based on the α-layer data value associated with the register;
obtaining two pixel data items and address information; and
storing the obtained pixel data items to a register of the plurality of registers indicated by the address information.

41. The image processing method of claim 40, where the number of registers for storing pixel data items corresponds to the number of possible values of the α-layer data.

42. The image processing method of claim 40, where the plurality of registers is provided within a storage within the gate array, and where storing the obtained pixel data items comprises transmitting the pixel data to an address of the storage based on a value of the corresponding α-layer data.

43. The image processing method of claim 42, where different processing methods are applied to pixel data stored at different addresses in the storage.

44. The image processing of claim 40, further comprising storing the outputted blended pixel data to an output register, where the output register is provided with a storage capacity corresponding to the data amount of a single blended pixel.

* * * * *